(12) United States Patent
Kato et al.

(10) Patent No.: US 6,276,338 B1
(45) Date of Patent: Aug. 21, 2001

(54) DIRECT FUEL INJECTION FOR ENGINE

(75) Inventors: Masahiko Kato; Junji Hakamata, both of Shizuoka (JP)

(73) Assignee: Sanshin Kogyo Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/464,825

(22) Filed: Dec. 17, 1999

(30) Foreign Application Priority Data

Dec. 17, 1998 (JP) .................................................. 10-358497

(51) Int. Cl.[7] ............................... F02M 37/04; F01P 1/06
(52) U.S. Cl. .......................................... 123/470; 123/41.31
(58) Field of Search .................................. 123/470, 472, 123/305, 41.31

(56) References Cited

U.S. PATENT DOCUMENTS

| | | | |
|---|---|---|---|
| 2,264,914 | * 12/1941 | L'Orange | 123/41.31 |
| 4,625,682 | * 12/1986 | Dietrich et al. | 123/41.31 |
| 4,757,789 | * 7/1988 | Laine | 123/470 |
| 4,768,487 | * 9/1988 | Yamamoto et al. | 123/470 |
| 4,773,374 | * 9/1988 | Kiuchi et al. | 123/470 |
| 5,329,902 | 7/1994 | Sakamoto et al. | . |
| 5,623,904 | 4/1997 | Matsumoto | . |
| 5,682,857 | * 11/1997 | Briggs et al. | 123/456 |
| 5,706,787 | * 1/1998 | Fujikawa | 123/470 |
| 5,709,190 | 1/1998 | Suzuki | . |
| 5,860,394 | * 1/1999 | Saito et al. | 123/467 |
| 5,915,349 | * 6/1999 | Biemelt | 123/305 |
| 5,934,253 | * 8/1999 | Kojima et al. | 123/470 |
| 5,960,766 | * 10/1999 | Hellmich | 123/305 |
| 6,009,856 | * 1/2000 | Smith, III et al. | 123/470 |

* cited by examiner

Primary Examiner—Thomas N. Moulis
(74) Attorney, Agent, or Firm—Knobbe, Martens, Olson & Bear, LLP

(57) ABSTRACT

A direct fuel injected engine includes an improved construction for preventing a fuel injector from holding considerable heat therein. A cylinder head of the engine has a cavity opened to a combustion chamber. A fuel injector is placed within the cavity and is arranged to directly spray fuel into the combustion chamber. At least one heat insulator is disposed between the cylinder head and the fuel injector to insulate the fuel injector, at least in part, generally from the cylinder head.

43 Claims, 14 Drawing Sheets

Figure 11  Figure 12
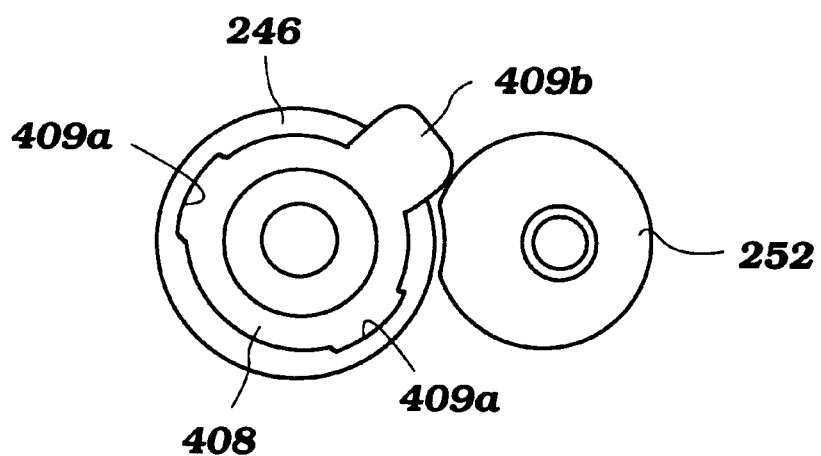
Figure 13

DIRECT FUEL INJECTION FOR ENGINE

PRIORITY INFORMATION

This application is based on and claims priority to Japanese Patent Application No. 10-358497, filed Dec. 17, 1998, the entire contents of which is hereby expressly incorporated by reference.

BACKGROUND OF THE INVENTION

1. Field of the Invention

This invention relates to a direct fuel injection system for an engine, and more particularly to an improved direct fuel injection system that protects the fuel injectors from heat.

2. Description of Related Art

In all fields of engine design, there is an increasing emphasis on obtaining more effective emission control, better fuel economy and, at the same time, continued high or higher power output. This trend has resulted in the substitution of fuel injection systems for carburetors as the engine charge former.

Fuel injection systems typically inject fuel into the air intake manifold. However, in order to obtain still better engine performance, direct injection systems are being considered. Direct fuel injection systems inject fuel directly into the combustion chamber. These systems potentially have significant advantages over typical fuel injection systems such as improved emission control.

In a direct injection system, a fuel injector is typically positioned in a cavity that is defined by a cylinder head. The nozzle of the fuel injector is exposed to the combustion chamber through an opening extending from the cavity so that the fuel may be injected directly into the combustion chamber. Usually, the inner diameter of the opening is smaller than the inner diameter of the cavity so that a step is formed between the opening and the cavity. The body of the fuel injector is seated at the step. A sealing member such as, for example, a disc spring is typically interposed between the injector body and the step so as to seal the combustion chamber.

Because the injector nozzle is exposed to the combustion chamber in which the injected fuel bums at an extremely high temperature, the fuel injector is exposed to considerable heat. Also, the sealing member may be insufficient to prevent the combustion flame from reaching the injector body. Additionally, the cylinder head itself is typically very hot and therefore heat conducts to the fuel injector from the cylinder head through the sealing member or directly to the fuel injector where the fuel injector contacts the cylinder head. The fuel injector is partially cooled by the injected fuel especially before the combustion stroke; however, this cooling effect is typically insufficient.

Accordingly, the fuel injector is exposed to a significant amount of heat that is conducted to the nozzle. This can causes significant problems. For example, a certain amount of liquid fuel that contains heavy oil components typically exists on the injector nozzle immediately after injection. If the heat in the injector nozzle exceeds the distillation temperature of the liquid fuel (for example, 90% of gasoline components evaporate at around 150°), the heavy oil components tend to deposit on the injector nozzle. Excessive deposits of the heavy oil components on the nozzle can cause deformations of the injector shape. Deformation of the injector shape can decrease or cause fluctuations in the amount of fuel injected into the engine. Accordingly, the fuel/air ratio may deviate from optimum conditions for the control of emissions. This phenomenon is particularly a problem for marine engines, which are typically two stroke engines, because combustion occurs at every stroke of the piston. Furthermore, marine engines are typically used at high loads and high engine speeds.

SUMMARY OF THE INVENTION

A need therefore exists for a direct fuel injection that prevents a fuel injector from holding considerable heat and particularly inhibits a nozzle of the fuel injector from having excessive heat therein. Fuel injection consequently stabilizes and correct emissions control results.

Accordingly, a direct fuel injected, internal combustion engine includes a cylinder body defining at least one cylinder bore in which a piston reciprocates. A cylinder head is affixed to an end of the cylinder body for closing the cylinder bore and defining a combustion chamber with the piston and the cylinder bore. The cylinder head has an aperture opened to the combustion chamber. A fuel injector is placed within the aperture and is arranged to directly spray fuel into the combustion chamber. At least one heat insulator is disposed between the cylinder head and the fuel injector to insulate and thereby generally isolate (i.e., thermally decouple) the fuel injector, at least in part, from the cylinder head.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

FIG. 11 is a cross sectional side view of a heat insulator employed in the fuel injector mounting construction shown in FIG. 7.

FIG. 12 is a front view of the same heat insulator.

FIG. 13 is a partial appearance view taken in the direction of the arrow 13 in FIG. 7 to show a cylinder head member and particularly a boss for mounting the fuel injector, with the fuel injector and other components removed to reveal the boss.

DETAILED DESCRIPTION OF THE PREFERRED EMBODIMENTS OF THE INVENTION

The general overall environment in which the present invention is practiced or can be practiced will be now be described with reference to FIGS. 1–6.

Figure 1:
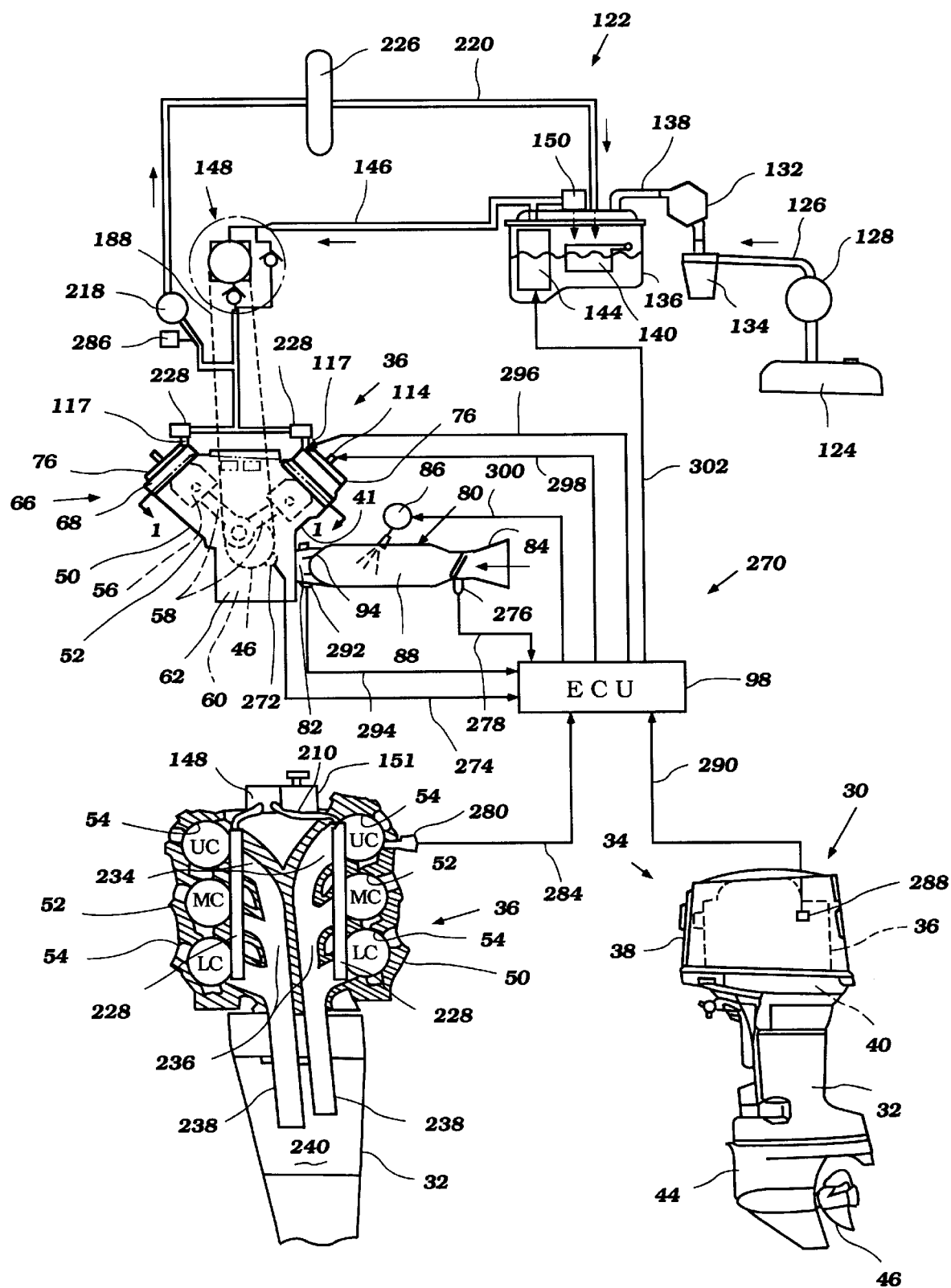
FIG. 1 is a multi-part view showing: in the lower right-hand portion, an outboard motor that employs a direct fuel injection system which relates to the present invention; in the upper view, a partially schematic cross-sectional view of the engine of the outboard motor with its air induction and fuel injection system shown in part schematically; in the lower left-hand portion, a rear elevational view of the outboard motor with portions removed and other portions broken away and shown in section along the line 1—1 in the upper view so as to more clearly illustrate the construction of the engine; and the fuel injection system shown in part schematically. An ECU (Electronic Control Unit) for the motor links the three views together.

In the lower-right hand view of FIG. 1, an outboard motor is depicted in side elevational view and is identified generally by the reference numeral 30. The entire outboard motor 30 is not depicted in that the swivel bracket and clamping bracket that are typically associated with the driveshaft housing 32, are not illustrated. These components are well known in the art and the specific method by which the outboard motor 30 is mounted to the transom of an associated watercraft is not necessary to permit those skilled in the art to understand or practice the invention.

The outboard motor 30 includes a power head, indicated generally by the reference numeral 34, that is positioned above the driveshaft housing 32 and which includes a internal combustion engine, indicated generally by the reference numeral 36. This engine 36 is shown in more detail in the remaining two views of this figure and will be described shortly by reference thereto.

The power head 34 is surrounded by a protective cowling that includes a main cowling member 38. This main cowling member 36 is detachably affixed to a lower tray portion 40 of the protective cowling. The lower tray portion 40 encloses an upper portion of the driveshaft housing 32.

Positioned beneath the driveshaft housing 32 is a lower unit 44 in which a propeller 46, which forms the propulsion device for the associated watercraft, is journaled.

As is typical with outboard motor practice, the engine 36 is supported in the power head 34 so that its crankshaft 46 (see the upper view) rotates about a vertically extending axis. This facilitates the connection of the crankshaft 46 to a driveshaft (not shown) which depends into the driveshaft housing 32. The driveshaft drives the propeller 46 through a conventional forward, neutral, reverse transmission contained in the lower unit 44.

The details of the construction of the outboard motor and the components which are not illustrated may be considered to be conventional or of any type known to those wishing to utilize the invention disclosed herein. Those skilled in the art can readily refer to any known constructions with which to practice the invention.

With continued reference to FIG. 1, the engine 36 of the illustrated embodiment is of the V6 type and operates on a two stroke, crankcase compression principle. Although the invention is described in conjunction with an engine having this cylinder number and cylinder configuration, it will be readily apparent that the invention can be utilized with engines having other cylinder numbers and other cylinder configurations. Also, although the engine 36 will be described as operating on a two-stroke principle, it will also be apparent to those skilled in the art that certain facets of the invention can be employed in conjunction with four-stroke engines as described later.

The engine 36 comprises a cylinder body or block 50 that forms a pair of cylinder banks 52. Each of these cylinder banks 52 is formed with three vertically spaced, horizontally extending cylinder bores 54 (cylinder sections are indicated as UC, MC and LC). Pistons 56 reciprocate in these cylinder bores 54. The pistons 56 are, in turn, connected to the upper or small ends of connecting rods 58. The big ends of these connecting rods are journaled on the throws of the crankshaft 46 in a manner that is well known in this art.

The crankshaft 46 is journaled in a suitable manner for rotation within a crankcase chamber 60 that is formed in part by a crankcase member 62 that is affixed to the cylinder block 50 in a suitable manner. As is typical with two-cycle engines, the crankshaft 46 and crankcase chamber 60 are formed with seals so that each section of the crankcase that is associated with one of the cylinder bores 54 will be sealed from the others. This type of construction is well known in the art.

Cylinder head assemblies, indicated generally by the reference numeral 66, are affixed to the end of the cylinder banks 52 that are spaced from the crankcase chamber 60. One cylinder head assembly 66 is shown in more detail in FIG. 4 and comprises a cylinder head member 68 that defines a plurality of recesses 70 in its lower face. Each of these recesses 70 cooperates with the respective cylinder bore 54 and the head of the piston 56 to define the combustion chambers 72 of the engine 36. The cylinder head members 68 are made of aluminum alloy die-cast.

Cylinder head cover members 76 complete the cylinder head assemblies 66. The cylinder head members 68 and cylinder head cover members 76 are affixed to each other and to the respective cylinder banks 52 in a suitable known manner. The cylinder head cover members 76 are also made of aluminum alloy die-cast.

Again with reference to FIG. 1, the air induction system, indicated generally by the reference numeral 80 delivers an air charge to the sections of the crankcase chamber 60 associated with each of the cylinder bores 54. This communication is via an intake port 82 formed in the crankcase member 62 and registering with each such crankcase chamber section.

The induction system 80 includes an air silencing and inlet device, shown schematically in this figure and indicated by the reference numeral 84. The air charge device appears in more detail in FIG. 2. This device 84 is contained within the forward end of the main protective cowling 38 and has a rearwardly facing air inlet opening 86 through which air is introduced. Air is primarily introduced into a pair of air compartments through a pair of rearwardly positioned air inlet openings and then admitted into the interior of the protective cowling 38 through air inlet barrels 87 disposed at the respective air compartments of the protective cowling 38.

As shown in FIG. 1, the air inlet device 80 supplies the induced air to a plurality of throttle bodies 88, each of which has a throttle valve 90 provided therein. These throttle valves 90 are supported on throttle valve shafts (not shown). These throttle valve shafts are linked together for simultaneous opening and closing of the throttle valves 90 in a manner that is well known in this art.

As is typical in two stroke engine practice, the intake ports 82 have provided in them reed-type check valves 94. These check valves 94 permit the air to flow into the sections of the crankcase chamber 60 when the pistons 56 are moving upwardly in their respective cylinder bores 54. However, as the pistons 56 move downwardly, the charge will be compressed in the sections of the crankcase chamber 60. At that time, the reed type check valve 94 will close so as to permit the charge to be compressed. In addition, a lubricant pump 96 is provided for spraying lubricant into the throttle body 88 for engine lubrication under the control of an ECU (Electronic Control Unit), shown schematically in FIG. 1 and identified by the reference numeral 98. Although it is not shown, some forms of direct lubrication may be also employed for delivering lubricant directly to certain components of the engine.

Figure 4:
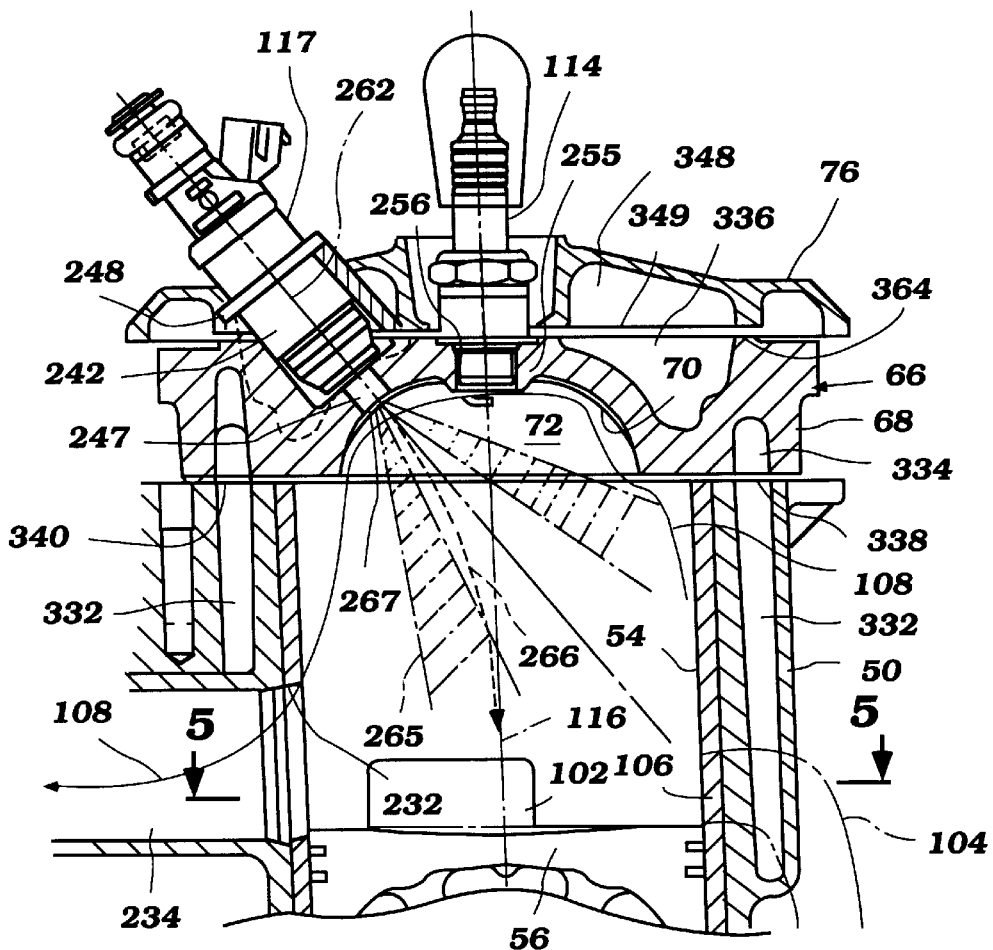
FIG. 4 is a cross-sectional top plan view taken through a portion of one of cylinders of the engine to show how a fuel injector and a spark plug are mounted, to shown a cooling arrangement of the fuel injector, and to show a fuel injection spray pattern with scavenging air flow.
Figure 5:
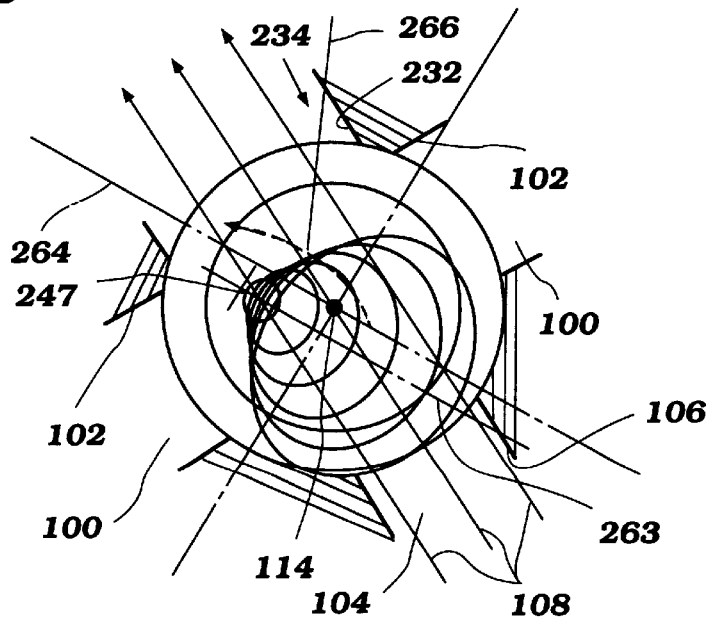
FIG. 5 is a schematic cross-sectional top plan view showing the cylinder taken along the line 5—5 in FIG. 4 and particularly illustrates the fuel injection spray pattern and the scavenging air flow therein.

The charge which is compressed in the sections of the crankcase chamber 60 is then transferred to the combustion chambers 72 as through a scavenging system, which is best shown in FIGS. 4 and 5. This scavenging system is of the Schnurle type and includes a pair of main scavenge passages 100 that are positioned on diametrically opposite sides. These main scavenge passages terminate in main scavenge ports 102 so as to direct scavenge air flows into the combustion chamber 72.

In addition, an auxiliary scavenging passage 104 is formed between the main scavenge passages and terminates in an auxiliary scavenging port 106 which also provides scavenging air flow indicated by the arrows 108. Thus, during the scavenging stroke, the intake charge will be transferred to the combustion chambers 72 for further compression as the pistons 56 move upwardly from their bottom dead center position so as to close the scavenge ports 102 and 106 and further compress the charge.

Although the auxiliary scavenging port 106 is indicated schematically in phantom to extend almost horizontally in FIG. 4, it actually extends slantwise and slightly upwardly to form the scavenging airflow 108 upwardly toward the recess 70 in the cylinder head member 68. The scavenging air flows from the main scavenging port 102 are also directed toward the recess 70. In addition, the main scavenging passages 100 are actually slightly directed toward the opposite side of the auxiliary scavenging passage 104, although they are indicated as completely confronting with each other in FIG. 5.

With continued reference primarily to FIG. 4, the spark plugs 114 are affixed to plug bosses 255, which have threaded openings 256. Each axis of the plug bosses 255 is consistent with a cylinder bore axis 116 of the cylinder bore 54 so that the spark plugs 114 extends straight along the cylinder bore axis 116. Accordingly, the spark plug 114 is mounted in the cylinder head assembly 66 for each cylinder bore 54 and has its own axis on the cylinder bore axis 116. That is, each spark plug 114 is disposed at generally the center portion of the combustion chamber 70 and stands generally straight. Also, its respective spark gap is disposed substantially on the cylinder bore axis 116 and exposed to the combustion chamber 70. The spark plugs 114 are fired under the control of the ECU 98. The ECU 98 receives certain signals, as will be described, for controlling the time of firing of the spark plugs 91 in accordance with any desired control strategy.

Each spark plug 114, in turn, fires a fuel air charge that is formed from the fuel sprayed by a fuel injector 117 and the air coming through the scavenge ports 102, 104. The fuel injectors 117 are solenoid type and electrically operated also under control of the ECU 98. The fuel injectors 117 are mounted directly in the cylinder head assembly 66 in a specific location so as to provide optimum fuel vaporization under all running conditions.

Fuel is supplied to the fuel injectors 117 by a fuel supply system, indicated generally by the reference numeral 122 (see the upper and lower left hand views of FIG. 1). The fuel supply system 122 comprises a fuel supply tank 124 that is provided in the hull of the watercraft with which the outboard motor 30 is associated. Fuel is drawn from this tank 124 through a conduit 126 by means of a first low pressure pump 128 and a plurality of second low pressure pumps 132. The first low pressure pump 128 is a manually operated pump and the second low pressure pumps 132 are diaphragm type pumps operated by variations in pressure in the sections of the crankcase chamber 60, and thus provide a relatively low pressure. A quick disconnect coupling is provided in the conduit 126 and also a fuel filter 134 is positioned in the conduit 126 at an appropriate location.

From the second low pressure pump 132, fuel is supplied to a vapor separator 136 which is mounted on the engine 36 or within the protective cowling 38 at an appropriate location. The fuel is supplied through a line 138. At the vapor separator 136 and end of the line 138, there is provided at a float valve that is operated by a float 140 so as to maintain a uniform level of fuel in the vapor separator 136.

A high pressure electric fuel pump 144 is provided in the vapor separator 136 and pressurizes fuel that is delivered through a fuel supply line 146 to a high pressure fuel pump, indicated generally by the reference numeral 148. The electric fuel pump 144, which is driven by an electric motor, develops a pressure such as 3 to 10 kg/cm². A low pressure regulator 150 is positioned in the line 146 at the vapor separator 136 and limits the pressure that is delivered to the high pressure fuel pump 148 by dumping the fuel back to the vapor separator 136. The high pressure fuel pump 148 can develop a pressure of, for example, 50 to 100 kg/cm² or more. A pump drive unit 151 is provided for driving the high pressure fuel pump 148.

Figure 2:
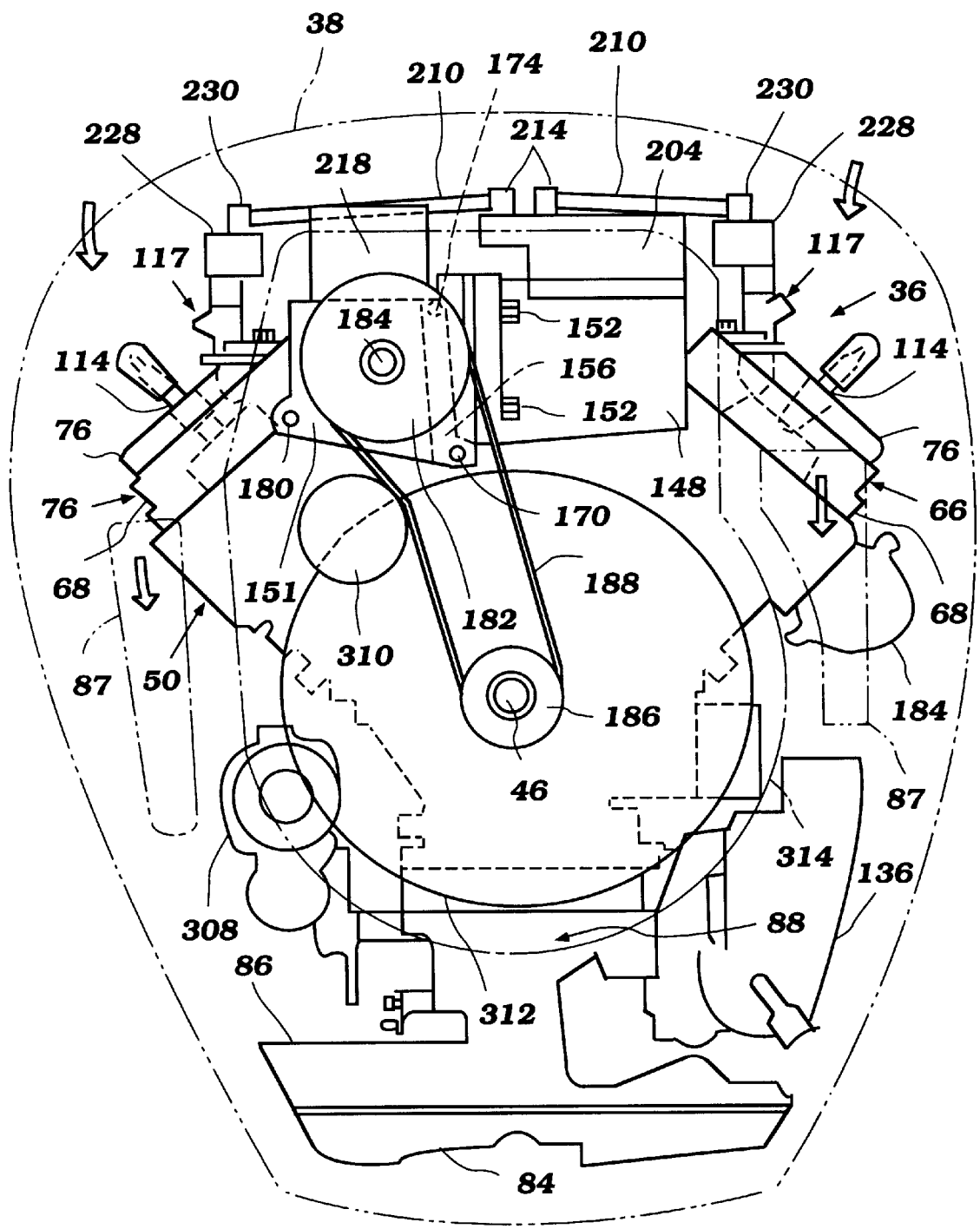
FIG. 2 is a top plan view showing a power head accommodating the engine. The engine is indicated in solid and a protective cowling enclosing the engine is shown in phantom.
Figure 3:
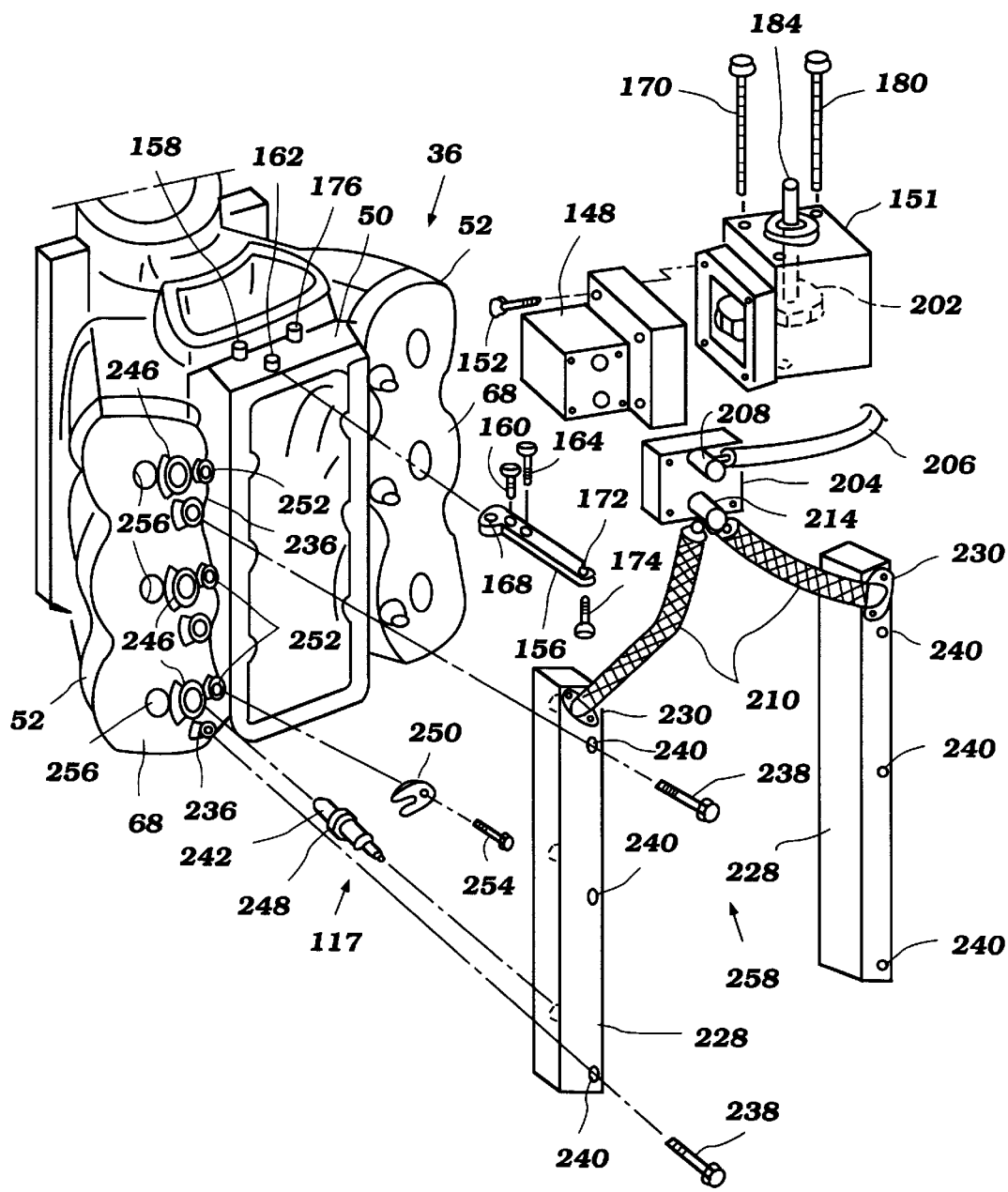
FIG. 3 is a perspective view showing the engine. Components of the fuel injection system are exploded from the engine.

As shown primarily in FIGS. 2 and 3, the high pressure fuel pump 148 is mounted on the pump drive unit 151 with bolts 152. A stay 156 is affixed to the cylinder block 50 at a boss 158 with a bolt 160 and at a boss 162 with a bolt 164. The pump drive unit 151 is then affixed to the stay 156 at a bolt hole 168 with a bolt 170 and at bolt hole 172 with a bolt 174. The pump drive unit 151 is, further, affixed to the cylinder block 50 directly at a boss 176 with a bolt 180. Thus, the pump drive unit 151 overhangs between the two banks 52 of the V arrangement. A pulley 182 is affixed to a pump drive shaft 184 of the pump drive unit 151. The pulley 182 is driven by a drive pulley 186 affixed to the crankshaft 46 by means of a drive belt 188. The pump drive shaft 184 is provided with a cam disc 202 existing horizontally for pushing plungers (not shown) which are disposed on the high pressure fuel pump 148.

The high pressure fuel pump 148 has a unified fuel inlet and outlet module 204 that is mounted on a side wall of the pressure pump 148. The inlet and outlet module 204 has an inlet passage (not shown) connected to the fuel supply line 206 with a connector 208, while an outlet passage (not shown) is connected to a pair of flexible conduits 210 with a connector 214.

With reference again to FIG. 1, the pressure of the fuel supplied by the high pressure fuel pump 148 is regulated to a fixed value by a high pressure regulator 218 that dumps fuel back to the vapor separator 136 through a pressure relief line 220 in which a fuel heat exchanger or cooler 226 is provided. It is important to keep the fuel under the constant pressure because the fuel amounts are determined by changes of duration of injection under constant fuel pressure.

With reference back to FIGS. 2 and 3 primarily, the flexible conduits 210 are connected to fuel supply rails 228 with connectors 230. The fuel supply rails 228 are made of metal so as to be rigid. The fuel supply rails 228 communicate with the flexible conduits 210 and also with fuel injectors 117 when they are held on the fuel supply rails 228.

The respective fuel rails 228 are affixed to both of the cylinder head members 68 at bosses 236 with positioning bolts 238. Apertures 240 are provided on the fuel rails 228 for the positioning bolts 238. The fuel injectors 117 are held between the fuel supply rails 228 and the cylinder head members 68. Mount sections or main bodies 242 of the fuel injectors 117 are inserted into injector bosses 246 so that injector nozzles 247 (see FIG. 4) are exposed to the combustion chambers 72. Flange portions 248 of the fuel injectors 117 are supported with forked members 250 that are affixed to the cylinder head member 68 at bosses 252 with bolts 254. The forked member 198 is made of anti-corrosive metal such as stainless steel and aluminum or synthetic resin.

The same bosses 236, 246, 252 are provided on the cylinder head member 68 of the other bank 52 and are simply shown schematically in FIG. 3. The high pressure fuel pump 148, pump drive unit 151, inlet and outlet module 204, flexible conduits 210, fuel rails 228 and fuel injectors 117 are unified together. These unified components form a high pressure fuel injection assembly 258.

Fuel is supplied from the high pressure fuel pump 148 to the flexible fuel conduits 210. The fuel conduits 210, in turn, deliver fuel to a pair of vertically extending fuel rails 228. The fuel rails 228, then, supply fuel to the fuel injectors 117.

As best seen in FIG. 4, each injector boss 246 is positioned at the side where the exhaust port 232 is disposed and has an axis 262 extending slantwise relative to the cylinder bore axis 116 of the cylinder bore 54. Since the fuel injector 117 is disposed in the boss 246, it also inclined relative to the cylinder bore axis 116. Also, as seen in FIG. 5, the injector nozzle 247 is positioned on a line 263 that is not consistent with a line 264 on which the spark plug 114 exists but extends in parallel to the line 264. Since the spark plug 114 is positioned straight on the cylinder bore axis 116, the line 264 exactly passes the center of the cylinder bore 54. The line 263, therefore, runs off the center line 264. The injection nozzles 247 are exposed to the combustion chambers through openings 267. However, they are schematically indicated with points in FIG. 5.

Each of the fuel injectors 117 sprays fuel into the combustion chamber 72 from its injection nozzle 247. The sprayed fuel expands into the combustion chamber 72 with the spray patterns as shown in FIGS. 4 and 5. The spray pattern, as shown in FIG. 4, splits off to two directions. This is because the injector nozzle 247 has a pair of small injection apertures that direct the fuel slightly outwardly relative to the axis 262.

The deviation of the injector nozzle 247 from the center line 264 causes a swirl 266 in the spray of the fuel. This is useful for preventing particles of the fuel from gathering together by collision and becoming larger.

Because the scavenging air flow 108 in each cylinder bore 54 that comes from the auxiliary scavenge port 106 is directed toward the fuel injector 117, the fuel sprayed by this fuel injector 117 is wafted by the scavenging air flow 1081 and deprives heat for vaporization from the inner wall portion of the cylinder head member 68 where the fuel injector 117 is positioned. Thus, this wall portion will be cooled down more than the other portions of the cylinder head member 68.

With reference again to Figure, after the fuel charge has been formed in the combustion chambers by the injection of fuel from the fuel injectors 117, the charge is fired by the spark plugs 114. The injection timing and duration, as well as the control for the timing of firing of the spark plugs 114, are controlled by the ECU 98.

Once the charge burns and expands, the pistons 56 will be driven downwardly in the cylinder bores 54 until the pistons 56 reach the lowermost position. At this time, an exhaust port 232 (see FIG. 4) will be uncovered so as to open the communication with an exhaust passage 234 formed in the cylinder block 50. The exhaust gasses flow through the exhaust passages 234 to manifold collector sections 236 of respective exhaust manifolds that are formed within the cylinder block 50.

A pair of exhaust pipes 238 depends from the lower tray portion 40, more specifically, its exhaust guide plate and extends into an expansion chamber 240 formed in the driveshaft housing 32. From this expansion chamber 240, the exhaust gasses are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

A feedback control system, indicated generally by the reference numeral 270 control the initiation and duration of fuel injection from the fuel injector 117 and the timing of the firing of the spark plugs 114. The feedback control system 270 comprises the ECU 98 and a number of sensors which sense either engine running conditions, ambient conditions or conditions of the outboard motor 30 that will effect engine performance.

Certain sensors are shown schematically in FIG. 1 and will be described by reference to that figure. For example, there is provided a crankshaft angle position sensor 272 that, when measuring crankshaft angle versus time, outputs a crankshaft rotational speed signal or engine speed signal indicated schematically at 274 to the ECU 98.

Operator demand or engine load, as determined by throttle angle of the throttle valve 90, is sensed by a throttle position sensor 276 which outputs a throttle position or load signal 278 to the ECU 98. When the operator desires to gather speed, i.e., accelerate the engine operation, a throttle on a steering handle (not shown) is operated by the operator. The throttle valve 90 is, then opened toward a certain open position that corresponds to the desired speed. Correspondingly, more air is induced into the crankcase chamber 60 through the throttle bodies 88. The engine load also increases when the associated watercraft advances against wind. In this situation, the operator also operates the throttle so as to recover the speed that may be lost.

A combustion condition or oxygen ($O_2$) sensor 280 senses the in cylinder combustion conditions by sensing the residual amount of oxygen in the combustion products at a time near the time when the exhaust port is opened. This output and air fuel ratio signal is indicted schematically at 284 to the ECU 98.

There is also provided a pressure sensor 286 that is connected to the pressure regulator 218. This pressure sensor 286 outputs the high pressure fuel signal to the ECU 98 (signal line is not shown in FIG. 1).

A water temperature sensor 288 (see the lower right-hand view) may also be provided for outputting a cooling water temperature signal 290 to the ECU 98. An engine cooling system which incorporates the sensor 288 will be described shortly.

Further, an intake air temperature sensor 292 (see the upper view) is provided and this sensor 292 outputs an intake air temperature signal 294 to the ECU 98.

Although these sensors shown in FIG. 1, it is, of course, practicable to provide other sensors such as an engine height sensor, a trim angle sensor, a knock sensor, a neutral sensor, a watercraft pitch sensor and an atmospheric temperature sensor in accordance with various control strategies.

The ECU 98, as has been noted, outputs signals to the fuel injectors 117, spark plugs 114, the lubrication pumps 96 and the high pressure electric fuel pump 144 for their respective control. These control signals are indicated schematically in FIG. 1 at 296, 298, 300 and 302, respectively.

In addition (see FIG. 2), a starter motor 308 for starting the engine 36, a tensioner 310 for giving tension to the belt 188, a flywheel 312 and a cover member 314 for covering the rotating components such as the high pressure fuel pump 148 are provided.

With reference again to FIG. 4 and additionally to FIG. 6, an engine cooling system will now be described.

The cylinder block 50 has a cylinder block cooling jacket 332 formed that encircles each cylinder bore 54. The cylinder head member 68, in turn, has two jackets on the front and rear sides. A cylinder head upstream cooling jacket 334 is formed at the front side, while a cylinder head downstream cooling jacket 336 is formed at the rear side. A gasket 338 is provided between the cylinder block 50 and the cylinder head member 68. Although the gasket 338 isolates the upstream jacket 334 from the cylinder block jacket 332, an aperture 340 is provided for allowing both of the jackets 332, 334 to communicate with each other.

Figure 6:
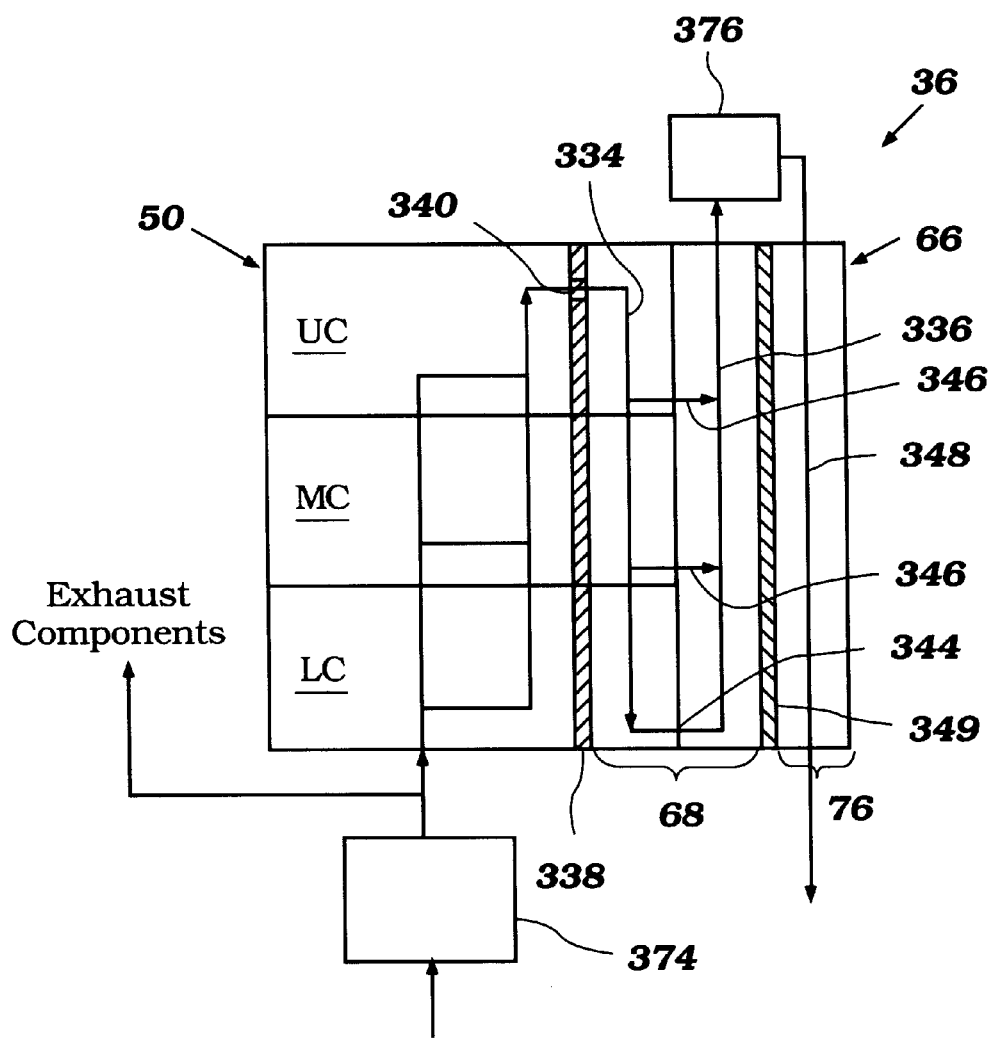
FIG. 6 is a schematic view showing cooling water flow through the engine.
Figure 7:
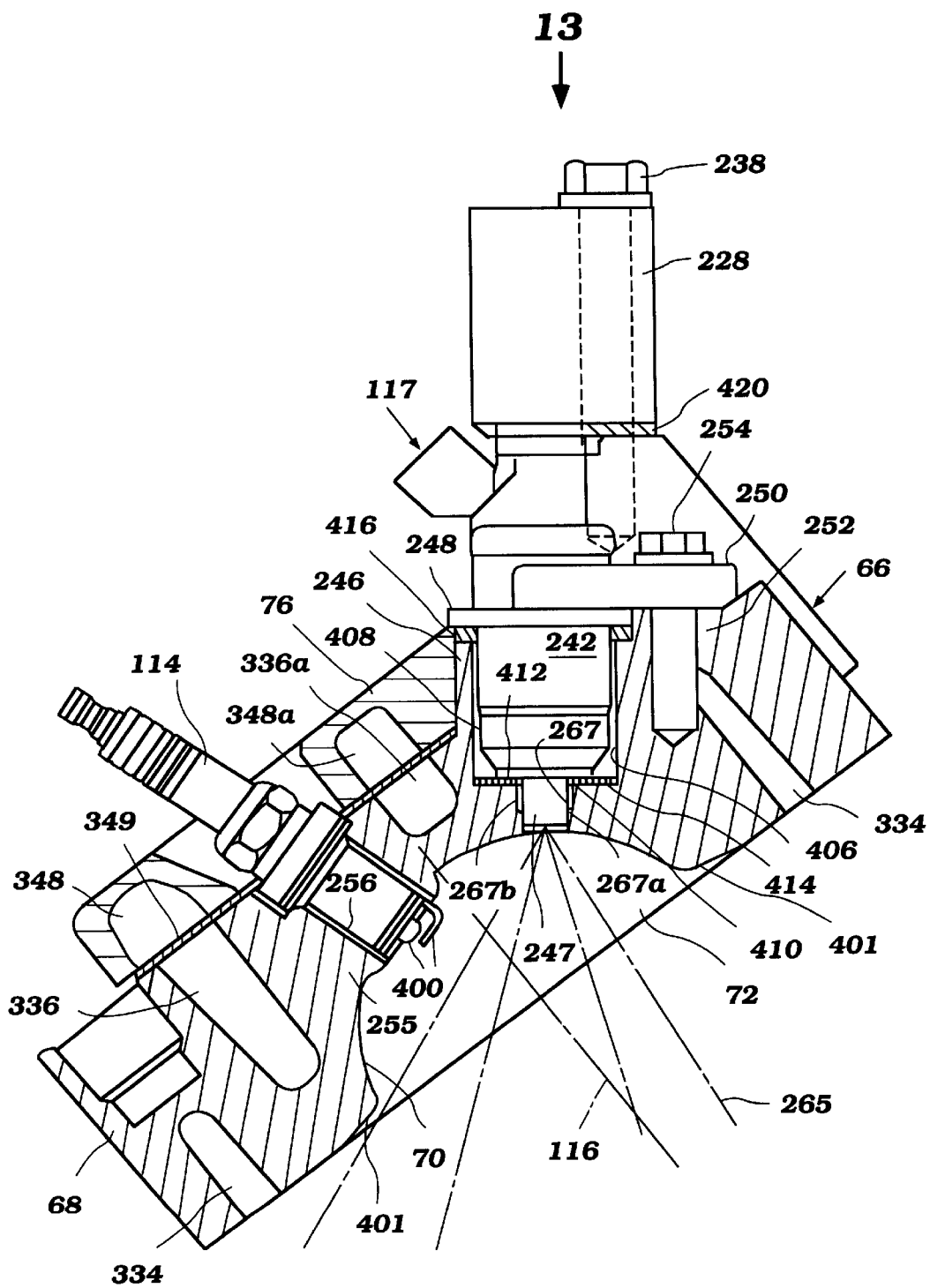
FIG. 7 is a cross-sectional top plan view showing a cylinder head assembly including a fuel injector and its mounting construction in accordance with an embodiment of the present invention.

As seen in FIG. 6, a two lower communication apertures 344 (only one illustrated) are formed at almost the bottom portion of the cylinder head member 68 to connect the upstream jacket 334 with the downstream jacket 336. The upstream jacket 334 and the downstream jacket 336 communicate with each other also through middle communication apertures 346 disposed between respective cylinder bores 54 (cylinder sections UC, MC and LC in FIG. 6).

The cylinder head cover member 76 has a cylinder head cover cooling jacket 348. Another gasket 349 is provided between the cylinder head member 68 and the cylinder head cover member 76. The cylinder head cover jacket 348 is completely isolated by this gasket 349.

As seen in FIG. 6, the cooling system includes a water pump 374 which introduces cooling water into the cooling system from the body of water surrounding the outboard motor 30. Part of this water is supplied to portions of the exhaust system to be used for cooling the exhaust system. The remainder of the water is supplied to the cylinder block cooling jacket 332 for cooling the cylinder block 50, specifically, the respective cylinder sections UC, MC and LC. The water then goes into the cylinder head upstream jacket 334 through the aperture 340 of the gasket 338. The water then primarily flows into a cylinder head downstream jacket 336 through the lower communication apertures 344. However, some of the water goes into the downstream jacket 336 en route through the middle communication apertures 346. The water flowing through the cylinder head upstream jacket 334 and the downstream jacket 336 cools the cylinder head member 68.

The water then goes to a thermostat compartment 376. The thermostat compartment 376 contains a thermostat. The thermostat controls the water flow in the water passage formed in the compartment 376. That is, when water temperature is lower than a predetermined value, the thermostat closes the passage. When it is higher than the predetermined value, the thermostat opens the passage. The water passing through the passage in the thermostat compartment 376 goes to the cylinder head cover jacket 348 in the cylinder head cover member 76 for cooling this portion. Finally, the water is discharged to the surrounding body of water. The aforementioned water temperature sensor 288 is located at a certain position downstream of the water pump 374 and in the engine 36.

With reference to FIGS. 7 to 13, a first embodiment of the present invention will now be described. As mentioned above, FIGS. 1–6 illustrate the general overall environment in which the present invention is practiced or can be practiced. Accordingly the structure of the cylinder head assembly in FIGS. 7–13 are slightly different from the structure described in FIGS. 1 to 6. Specifically, these differences relate to the arrangement of the fuel injector and spark plug and the arrangement of cooling jackets according to the present invention. Components and members that are common between the Figures are assigned the same reference numerals and will not be described unless specific descriptions are necessary.

Each spark plug 114 in this embodiment is decentered and inclined relative to the cylinder bore axis 116 so that its electrodes 400 that form a spark plug are directed toward the axis 116. That is, both of the fuel injector 117 and the spark plug 114 face with each other at a certain angle and their axes are generally directed to the center of the combustion chamber 72. The combustion chamber 72 in this illustrated embodiment has a squish area 401 that is well known in the art.

Figure 9:
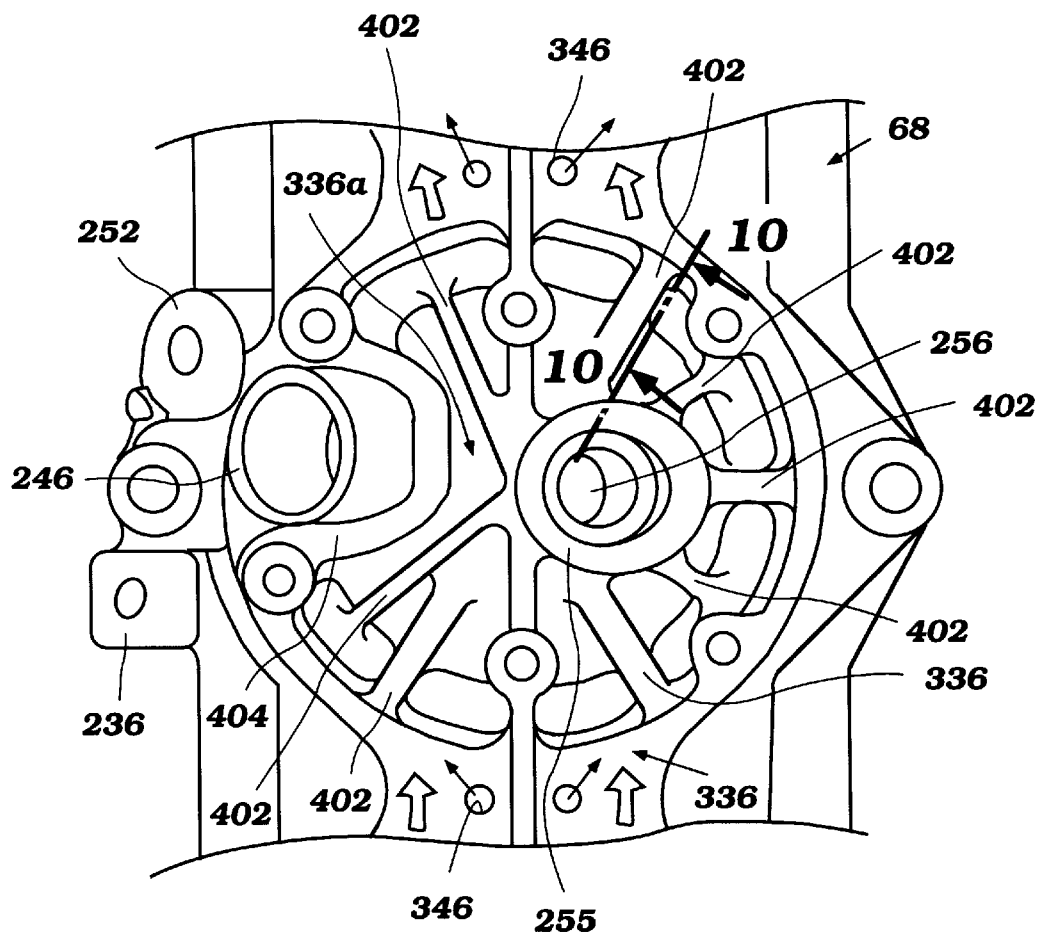
FIG. 9 is a partial rear elevational view showing the same cylinder head member. All components including the fuel injector also are removed.
Figure 10:
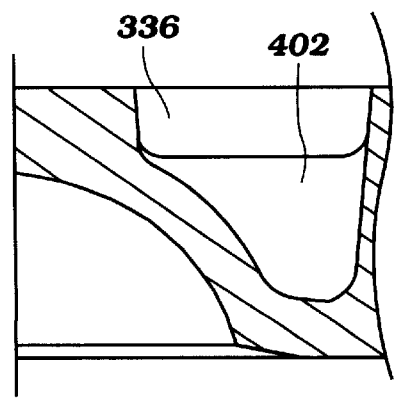
FIG. 10 is a partial cross-sectional top plan view taken along the line 10—10 in FIG. 9 to show the same cylinder head member.

Also, additional sections 336a, 348a of the cylinder head downstream cooling jacket 336 and the cylinder head cover cooling jacket 348 are provided between the boss 246 of the fuel injector 117 and the boss 255 of the spark plug 117. As seen in FIGS. 9 and 10, the cylinder head member 68 of each cylinder section UC, MC, LC has a plurality of ribs 402 in the downstream cooling jacket 336. These ribs 402 extend radially from a center of the cylinder section UC, MC, LC. The ribs 402 not only reinforce the cylinder head members 68 but also increase surface area that contacts cooling water and expedite cooling effect. The basal part 404 of the injector boss 246 and the plug boss 255 put their tops out of the water.

Figure 8:
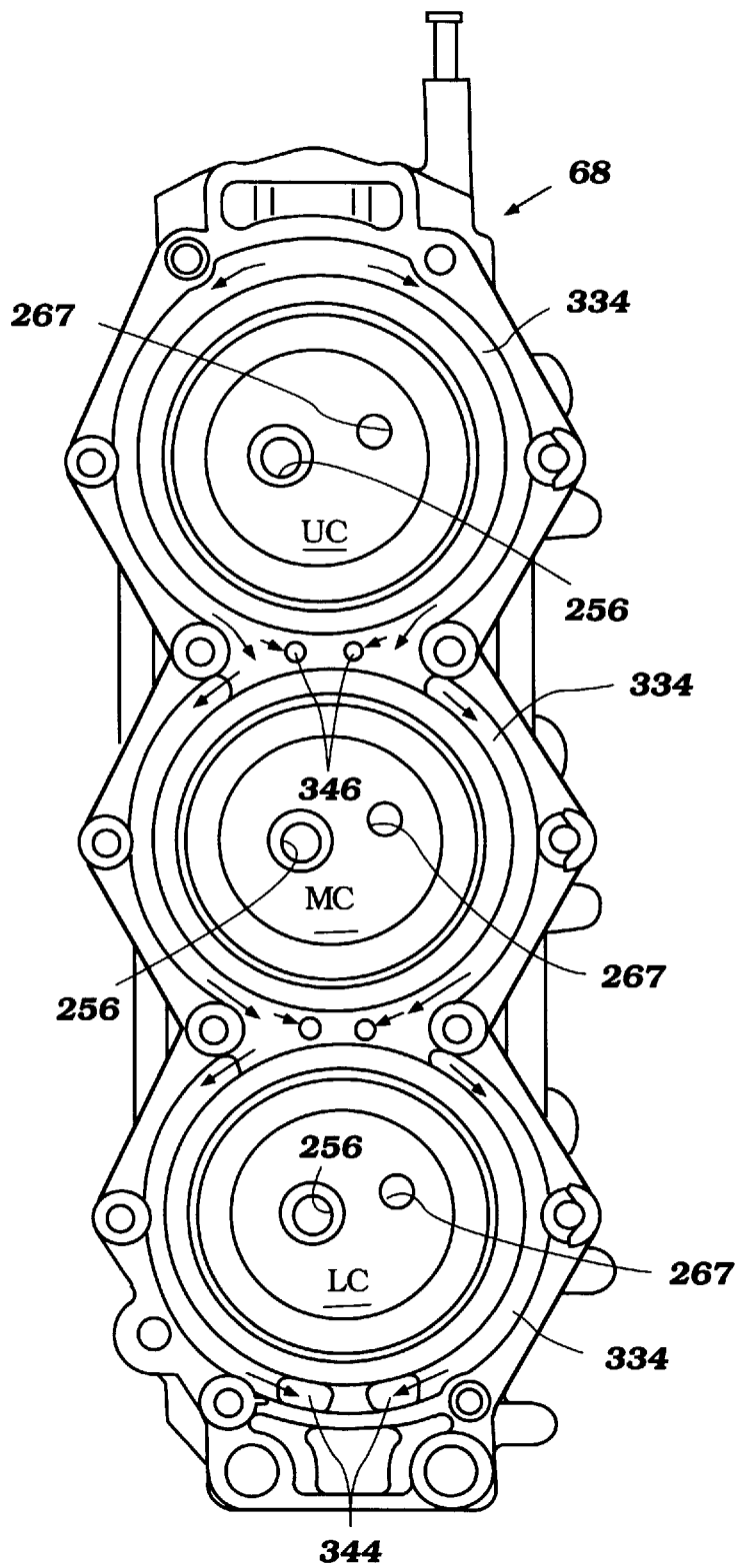
FIG. 8 is a front elevational view showing the cylinder head member. All components including the fuel injector are removed in this figure.

As described with FIG. 6, the cooling water flows downwardly in the upstream cooling jacket 334 (see FIG. 8). Some water bypasses through the apertures 346 to the downstream cooling jacket 336 and the reminder passes through the lower communication apertures 344 to the downstream jacket 336. The water, then, goes up toward the thermostat compartment 376 through the downstream jacket 336 which has the ribs 402.

The number of the ribs 402 at the side where the spark plug boss 255 exists is greater than the number of the ribs 402 at the other side where the fuel injector boss 246 exists. This is because the side having the injector boss 246 is cooled more than the side having the plug boss 255 and hence the side having the plug boss 255 requires stronger cooling effect than the other side. The reason why the side having the injector boss 246 is cooled more than the other side is that, as described above, the fuel sprayed by the fuel injector 117 is deprived heat for vaporization from the inner wall portion of the cylinder head member 68. As noted above, the exhaust port 234 exists at the side having the injector boss 246.

Returning back to FIG. 7, a fuel injector mounting construction in accordance with the first embodiment of the present invention will now be described more in detail.

The main body portion 242 of each fuel injector 117 is disposed within a cavity 406 defined in the injector boss 246 of the cylinder head member 68. Since an inner diameter of the cavity 406 is larger than an outer diameter of the injector body 242, a space 408 is formed between these two parts. As best seen in FIG. 13, the space 408 has deeper portions 409a, 409b that are formed by recesses formed in the inner wall of the injector boss 246. Particularly, the portion or recess 409b extends the deepest beyond the boss 246. Meanwhile, the nozzle 247 of the fuel injector 117 is disposed in the opening 267 that comprises, specifically, a small portion 267a and a large portion 267b. The large portion 267b exists closer to the main body 242 of the fuel injector 117 than the smaller portion 267a and has an inner diameter larger than an inner diameter of the small portion 267a. The inner diameter of the smaller portion 247 is almost the same as the outer diameter of the nozzle 247. Thus, a space 410 is only formed between the nozzle 247 and the larger portion 267b of the opening 267. The cavity 406 and the opening 267 together define an aperture for receiving the fuel injector 117.

Also, since the inner diameter of the cavity 406 is larger than the inner diameter of the larger portion 267b of the opening 267, a step 412 is defined between the cavity 406 and the opening 267. The main body 242 of the injector 117 is seated at the step 412.

In the illustrated embodiment, a heat insulator 414 is interposed between the step 412 and the main body 242. The heat insulator 414 is preferably made of, for example, a glass fiber or ceramics. However, a metal material which has heat transfer rate smaller than that of aluminum alloy may also be used. The heat insulator is flat and ring shaped as shown in FIGS. 11 and 12. Since the heat insulator 414 is elastic, it can also work as a seal member when the bolt 254 is fixed up tightly to the cylinder head member 68. However, an additional seal member could also be employed. As seen in FIGS. 11 and 12, the illustrated embodiment employs such a seal member 415 which is attached around the inner aperture of the insulator 414. The seal member 415 is made of metal material. Since the seal member 415 is very thin, a diameter of the inner aperture of the heat insulator 414 is generally equal to the outer diameter of the nozzle 247. Meanwhile, an outer diameter of the insulator 414 is generally equal to the inner diameter of the cavity 406. Therefore, in the event combustion flame might pass through the opening 267, the heat insulator 412 would securely prevent it from entering the space 408.

Another heat insulator 416, which is made of the same material as the heat insulator 242, is interposed between the flange portion 248 of the fuel injector 117 and the top of the injector boss 246. That is, the main body 242 of the injector 117 is insulated from the cylinder head member 68 by the heat insulators 414, 416 and the space 408 which is filled with air.

As described above, a large part of the fuel injector 117 is insulated from the cylinder head member 68. Also, only small area of the nozzle 247 contacts a small portion 267a of the opening 267. Furthermore, only the tip portion of the nozzle 257 is exposed to combustion flame. Accordingly, very little heat from the cylinder head 68 and the combustion chamber 72 is transferred to the fuel injector 117. Heat that is received by the fuel injector 117 is primarily taken by the fuel flowing through the injector 117 and the reminder will be dissipated to the air surrounding the injector 117. Therefore, the fuel injector 117 and the nozzle 247 is shielded from heat The fuel injector is therefore prevented from overheating and the control of emission is improved.

In this embodiment, a third heat insulator 420, which is again made of the same material as the heat insulator 414, is further provided between the cylinder head member 68 and the fuel rail 228. The fuel in the rail 228, thus, is not heated by the heat in the cylinder head member 68. This also prevents heavy oil components from depositing on the nozzle 247.

Figure 14:
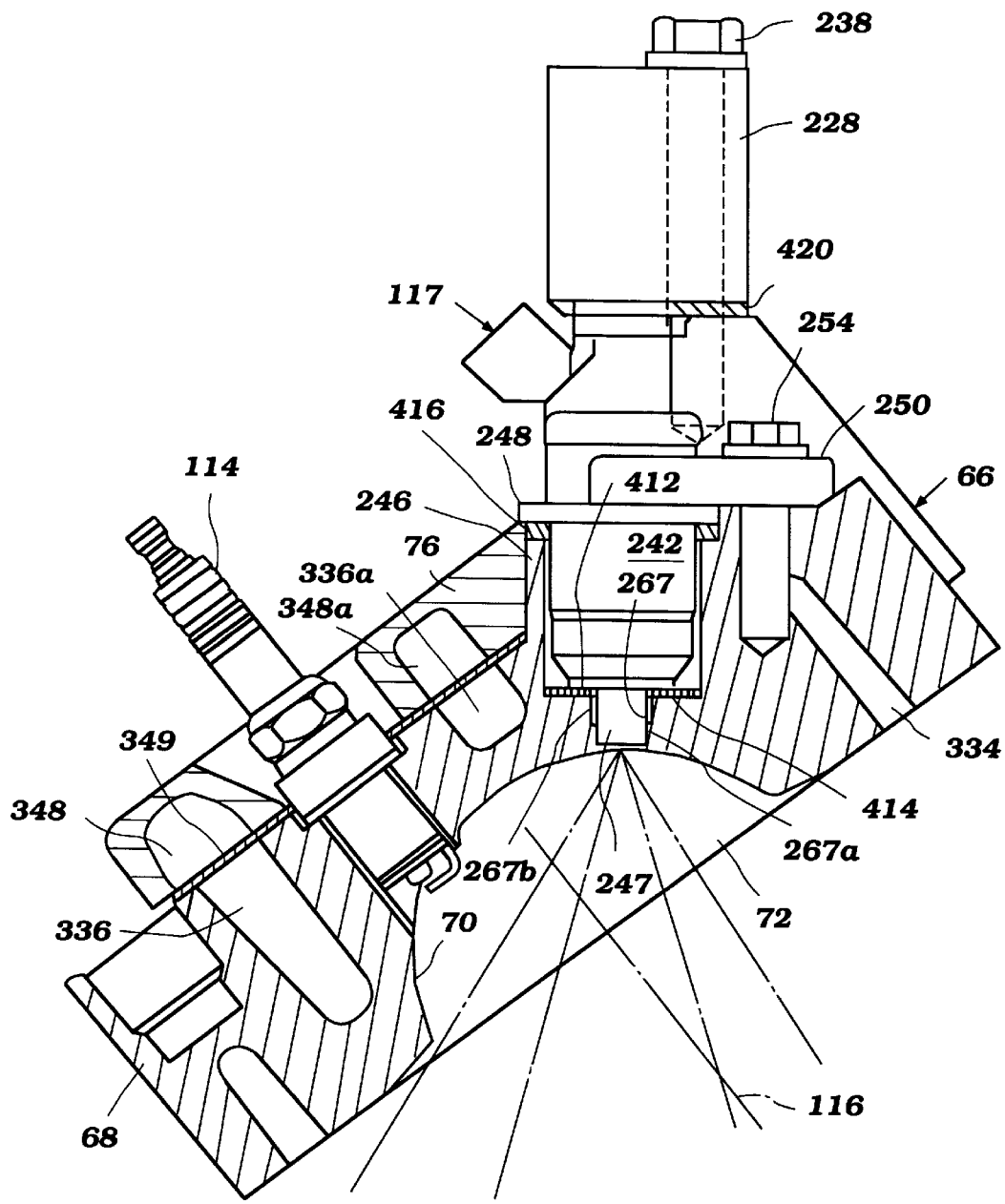
FIG. 14 is a partial cross-sectional top plan view showing a cylinder head assembly including a fuel injector and its mounting construction in accordance with another embodiment of the present invention.

FIG. 14 illustrates a second embodiment of the present invention. In this embodiment, the spark plug 114 is decentered from the cylinder bore axis 116 but is not inclined relative to the cylinder bore axis. Accordingly, the spark plug but extends parallel to the cylinder axis. The other part of its structure is the same as the structure shown in FIGS. 7 to 13. Because, the electrodes 400 of the plug 114 that form the flame are positioned farther from the nozzle 247, this arrangement provides a flame formed from the spark plug 114 that does not reach the tip portion of the nozzle 247 of the fuel injector 117.

Figure 15:
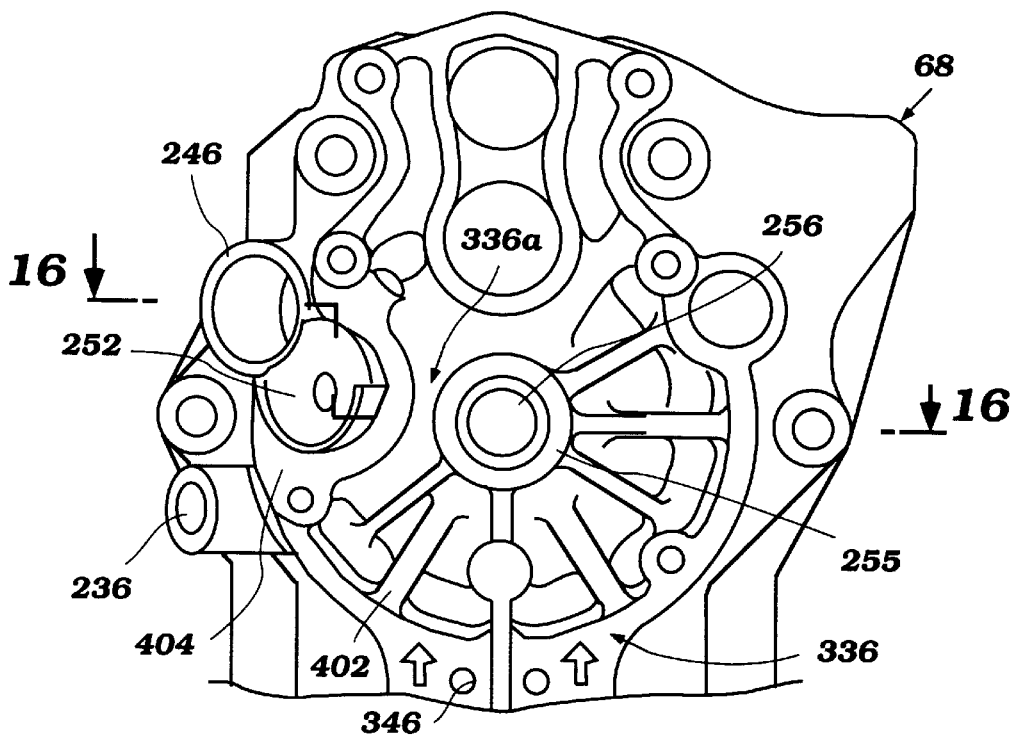
FIG. 15 is a partial rear elevational view showing a cylinder head member in accordance with an additional embodiment of the present invention. All components including the fuel injector are removed also.
Figure 16:
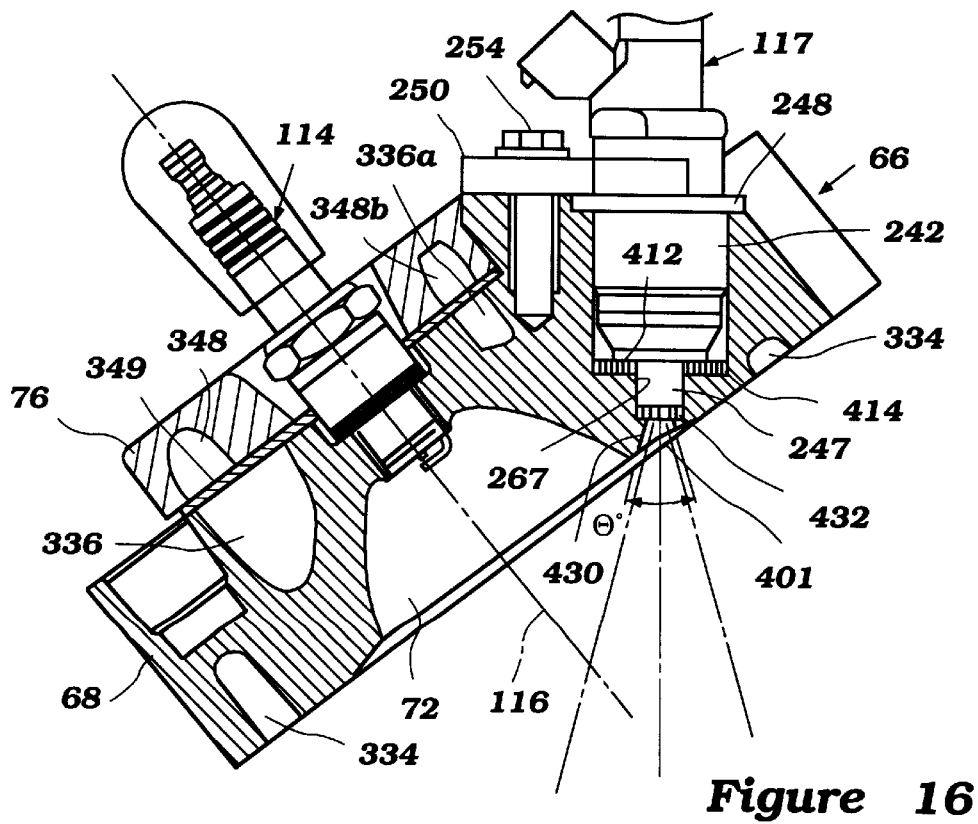
FIG. 16 is a partial cross-sectional top plan view taken along the line 16—-16 in FIG. 15 to show a cylinder head assembly including the cylinder head member, a fuel injector and its mounting construction.

FIGS. 15 and 16 illustrate a third embodiment of the present invention. In this embodiment, the spark plug 114 is positioned exactly on the cylinder bore axis 116 and not inclined. The combustion chamber 72 in this illustrated embodiment also has a squish area 401. The opening 267 in which the nozzle 247 of the fuel injector 117 exists is opened to the squish area 401 through a connecting passage 430. The connecting passage 430 expands gradually toward the squish area 401 at an angle of θ°. In other words, it is gradually tapered or becomes narrower toward the opening 267. The heat insulator 414 is interposed between the main body 242 of the injector 117 and the step 412. Another heat insulator 432 is interposed between the tip portion of the nozzle 247 and a step which is formed because the connecting passage 430 becomes narrower toward the opening 267. This heat insulator 432 is shaped as a ring and a flat sheet so that injection openings that are formed at the tip portion of the nozzle 247 are not covered by the insulator 432.

As noted above, the opening 267 does not open directly to the combustion chamber 72 but to the squish area 401. Also, the connecting passage 430 is gradually tapered toward the opening 267. A heat insulator 432 is provided at the tip portion of the nozzle 247 additionally to the heat insulator 414. Accordingly, the heat in the cylinder head member 68 is prevented from being conducted to the fuel injector 117 and the combustion flame is prevented from reaching the nozzle 247.

Figure 17:
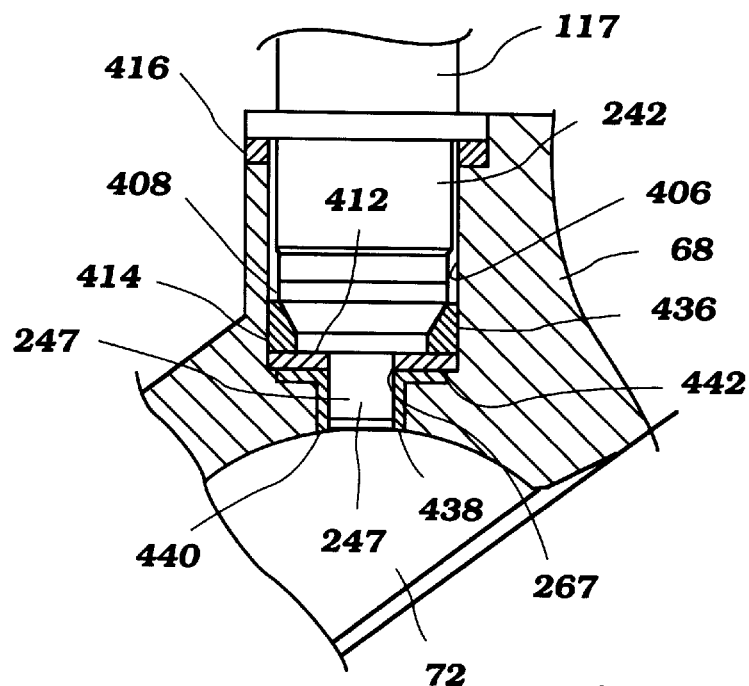
FIG. 17 is a partial cross-sectional top plan view showing a fuel injector and its mounting construction in accordance with another embodiment of the present invention.

FIG. 17 illustrates fourth embodiment of the present invention. In this embodiment, a third heat insulator 436 is added to support the main body 242 of the fuel injector 117. This insulator 436 generally completely fills up a lower part of the space 408 because it is shaped cylindrically along the outer line of the main body 242 of the injector 117. The configuration of the third heat insulator 436 is useful for maintaining the space 408. A collar 438 which has a cylindrical portion 440 and a flange portion 442 is fitted onto the nozzle 247. This collar 438 is made of metal material and manufactured by machining. In this illustrated arrangement, the step 412 is preferably formed with a couple of portions that have different inner diameters. However, a single step configuration is of course available.

Because the collar is machined, the collar 438 has no blowhole. The heat insulator 414 is seated on the flange portion 432 of the collar 438 and can seal up the combustion chamber 72 even though the step 412 has a blowhole or blowholes.

The collar 438 can be made of the same material of the heat insulator 414. This variation is lightly inferior to the collar 438 made of metal. However, heat insulation will be almost be perfect and the flame will be completely prevented from reaching the main body 242 of the fuel injector 117.

Figure 18:
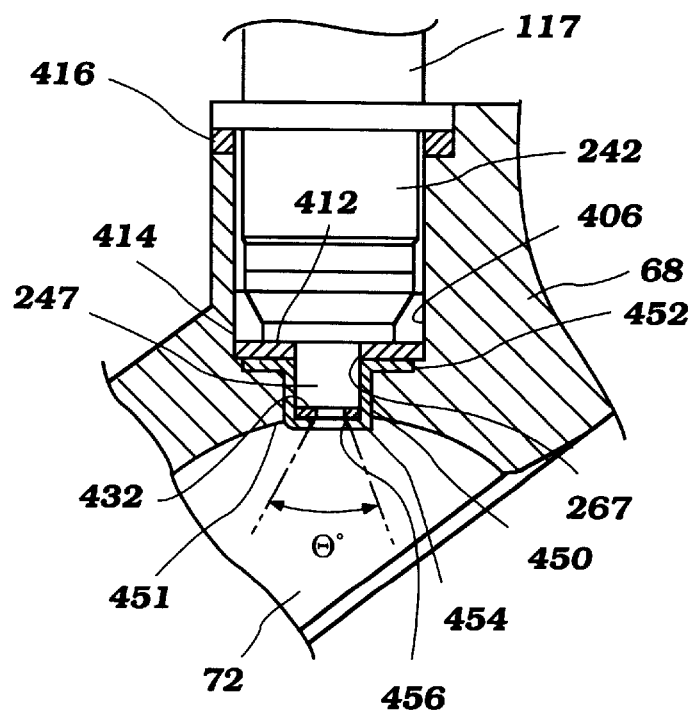
FIG. 18 is a partial cross-sectional top plan view showing a fuel injector and its mounting construction in accordance with a further embodiment of the present invention.

FIG. 18 illustrates a fifth embodiment of the present invention. In this embodiment, the third heat insulator 436 is preferably not employed. However, a third insulator may be used if applicable. A collar 450 having a cylindrical portion 451 and a flange portion 452, which is similar to the collar 438, is employed at the same position as the collar 438. The collar 450 includes a sub-enclosure section 454 at its bottom. The sub-enclosure section 454 forms an opening 456 that is gradually tapered toward the nozzle 247. In other words, the sub-enclosure section 454 expands gradually toward the combustion chamber 72 at an angle of θ°. The same heat insulator 432 that is used in the third embodiment shown in FIG. 16 is again interposed between the tip portion of the nozzle 247 and the sub-enclosure section 454 of the collar 450. That is, the heat insulator 432 is held by the sub-enclosure section 454.

Therefore, the collar 450 can cover a blowhole at the step 412, if any, and additionally the heat insulator 432 can reduce the area that receives heat. The collar 450 in this embodiment is preferably made of metal but it can be made of a heat insulation material like the collar 438.

Figure 19:
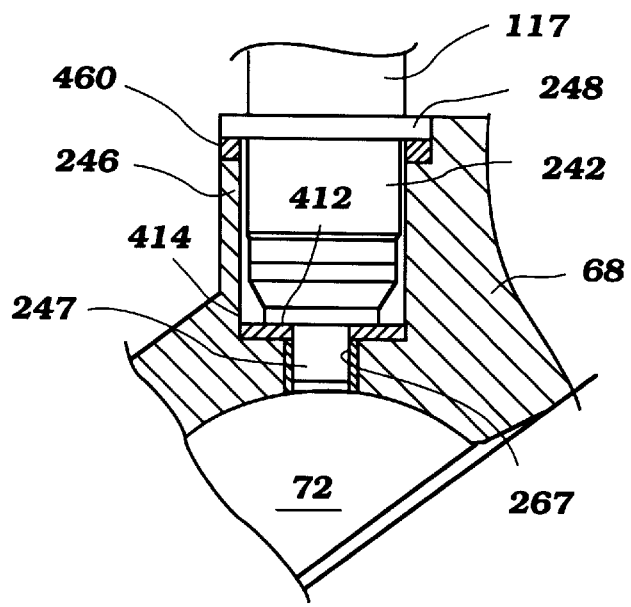
FIG. 19 is a partial cross-sectional top plan view showing a fuel injector and its mounting construction in accordance with an additional embodiment of the present invention.

FIG. 19 illustrates sixth embodiment of the present invention. In this embodiment, a waterproofing seal member 460 is provided instead of the heat insulator 416 that is employed, for example, in the first embodiment shown in FIG. 7. An outboard engine 36 is typically used in a water mist. The main body 242 including the flange portion 248 is made of stainless steel and the cylinder head member is made of aluminum alloy. Accordingly, the both metals are likely to create electrical corrosion where they meet, If electrical corrosion occurs, the metals will probably adhere to each other. The waterproofing seal member 460 is advantageous to prevent this adhesion because the seal member 460 isolates contact of the fuel injector 117 with the top of the injector boss 246 and further precludes the water mist entering the space 408.

Figure 20:
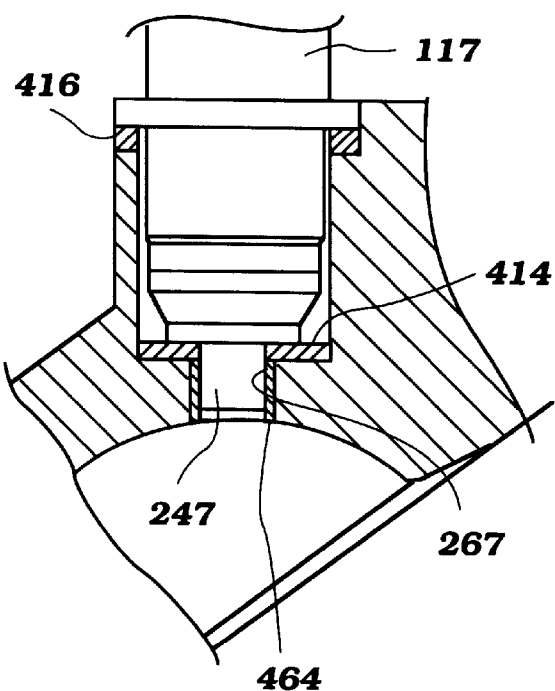
FIG. 20 is a partial cross-sectional top plan view showing a fuel injector and its mounting construction in accordance with another embodiment of the present invention.
Figure 21:
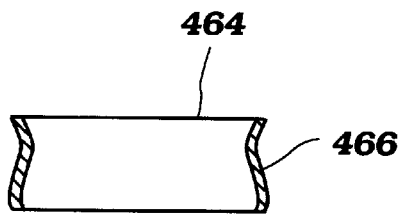
FIG. 21 is an enlarged cross-sectional view of a heat insulator employed in the mounting construction shown in FIG. 20.

FIG. 20 illustrates seventh embodiment of the present invention. In this embodiment, a cylindrical or ring shaped heat insulator 464 is fitted onto the nozzle 247. The cylindrical insulator 464 is shown in FIG. 21. As seen in this figure, the insulator 464 is tapered inwardly at its center portion 466. Therefore, it has elasticity and can be press fitted into the opening 267 and around the nozzle 247. The heat insulator 464 is preferably made of fiberglass, ceramics or metal material which has heat transfer rate smaller than that of aluminum alloy as other heat insulators.

Figure 22:
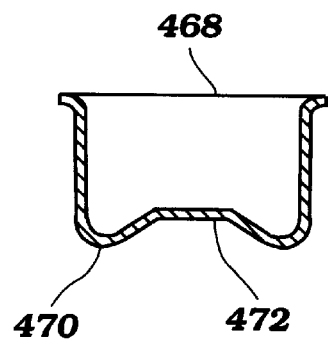
FIG. 22 is an enlarged cross-sectional view of a variation of the heat insulator.

FIG. 22 illustrates another cylindrical heat insulator 468 as a variation of the cylindrical heat insulator 464. This heat insulator 464 has a sub-enclosure portion 470 that encloses the tip portion of the nozzle 247 except for the injection openings. The subenclosure portion 470 bulges out slightly and an aperture 472 is formed for excepting the injection openings.

All of the heat insulators described above are preferably made of fiberglass, ceramics, some kind of metals or other materials which are known as having the heat insulation nature even though it is not described specifically with each embodiment.

Figure 23:
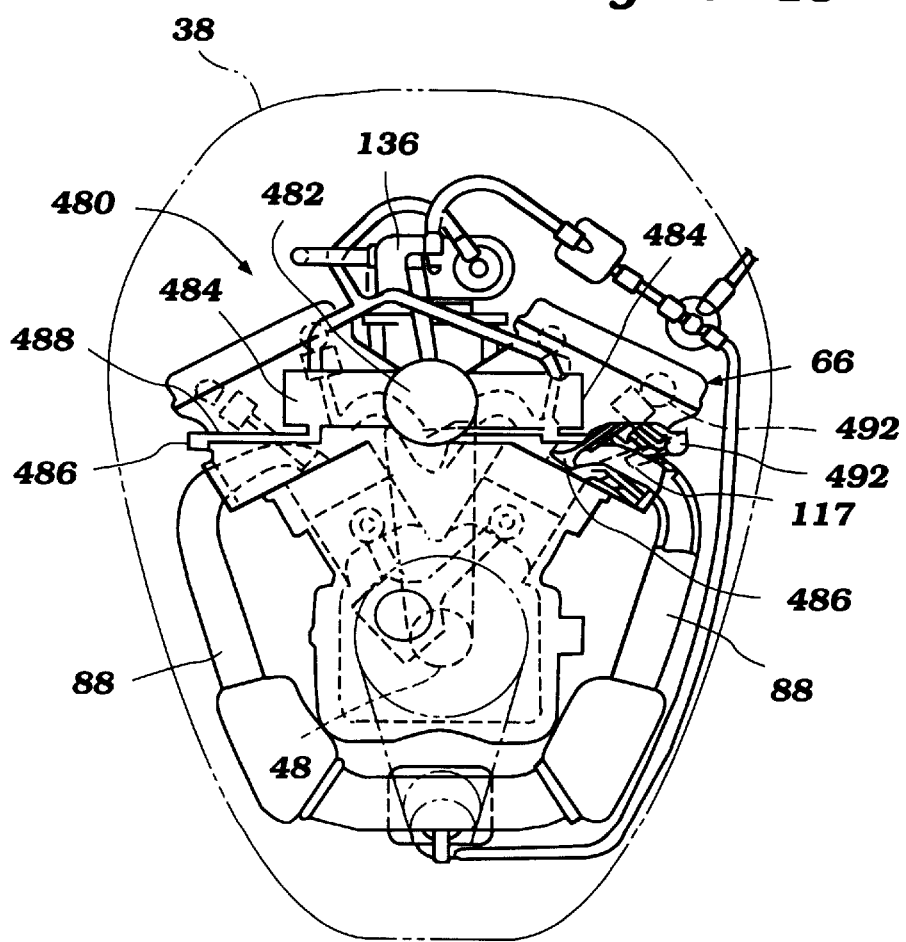
FIG. 23 is a top plan view showing a power head of an outboard motor which incorporates a four stroke engine that can employ any one of the fuel injector mounting constructions in accordance with the embodiments of the present invention. The engine is indicated in solid and a protective cowling enclosing the engine is shown in phantom.

The features of the present invention can be embodied in an engine other than the two-stroke engine as described above. For instance, a four-stroke engine such as an engine 480 shown in FIG. 23 can employ these features. In this engine 480, a pump drive unit 482 is provided on the engine 480 and a pair of high pressure fuel pumps 484 are located at both sides of the pump drive unit 482. A pair of fuel supply rails 486 are provided and connected with the high pressure fuel pumps 484 with flexible conduits 488. Special components for the four stroke engine 480 are, for example, intake valves 490 and camshafts 492.

Also, the features of the present invention are applicable not only to outboard motors but also to other engines for marine propulsion systems such as stem drive systems, for land vehicles such as motorcycles and automobiles, and for utility machines such as lawn mowers. Stationary engines can also employ them.

Of course, the foregoing description is that of preferred embodiments of the invention. All of these embodiments are intended to be within the scope of the invention herein disclosed. These and other embodiments of the present invention also will become readily apparent to those skilled in the art from the foregoing detailed description of the preferred embodiments, and thus, the invention is not limited to any particular preferred embodiments disclosed. Additionally, those skilled in the art will appreciate that various aspects of the disclosed embodiments can be combined and practiced together. It is not necessarily all objects or advantages described above be achieved in accordance with any particular embodiment of the invention. Thus, those skilled in the art will recognize that the invention may be embodied or carried out in a manner that achieves or optimizes one advantage or group of advantages as taught herein without necessarily achieving other objects or advantages as may be taught or suggested herein. Accordingly, various changes and modifications may be made without departing from the spirit and scope of the invention, and the scope of the present invention is intended to be defined only by the claims that follow.

What is claimed is:

1. A direct fuel injected, internal combustion engine comprising a cylinder body defining at least one cylinder bore in which a piston reciprocates, a cylinder head affixed to an end of said cylinder body for closing said cylinder bore and defining a combustion chamber together with said piston and said cylinder bore, said cylinder head defining an aperture opened to said combustion chamber, a fuel injector placed within said aperture and arranged to directly spray fuel into said combustion chamber, said fuel injector including a main body and a nozzle extending from said main body toward said combustion chamber, said nozzle having an outer diameter smaller than an outer diameter of said main body, said aperture including a main body holding section and a nozzle holding section, said main body holding section having an inner diameter larger than the outer diameter of said main body so as to define a buffer space between an outer surface of said main body and an inner surface of said main body holding section, said main body holding section and said nozzle holding section together defining a step therebetween, and a heat insulator disposed at said step, said main body being seated on said step via said heat insulator in positioning said nozzle within said nozzle holding section and in forming said buffer space.

2. A direct fuel injected, internal combustion engine as set forth in claim 1, wherein said heat insulator has a flat shape.

3. A direct fuel injected, internal combustion engine as set forth in claim 1, wherein said heat insulator has a ring shape through which said nozzle extends.

4. A direct fuel injected, internal combustion engine as set forth in claim 3, wherein a seal member is attached on said heat insulator.

5. A direct fuel injected, internal combustion engine as set forth in claim 4, wherein said seal member is attached around an inner opening of said heat insulator.

6. A direct fuel injected, internal combustion engine as set forth in claim 5, wherein said seal member is made of metal material.

7. A direct fuel injected, internal combustion engine as set forth in claim 1, wherein said heat insulator has a cylindrical section through which said main body extends, and said cylindrical section supports said main body so as to ensure said buffer space.

8. A direct fuel injected, internal combustion engine as set forth in claim 1, wherein said heat insulator has a cylindrical section through which said nozzle extends.

9. A direct fuel injected, internal combustion engine as set forth in claim 8, wherein said heat insulator has a flange section disposed on said step.

10. A direct fuel injected, internal combustion engine as set forth in claim 8, wherein said nozzle has at least one injection opening, and said heat insulator has a sub-enclosure section that encloses a tip portion of said nozzle except for said injection opening.

11. A direct fuel injected, internal combustion engine as set forth in claim 10, wherein said sub-enclosure section forms an opening gradually tapered toward said nozzle.

12. A direct fuel injected, internal combustion engine as set forth in claim 10, wherein said sub-enclosure section holds a second heat insulator.

13. A direct fuel injected, internal combustion engine as set forth in claim 8, wherein said heat insulator is tapered inwardly.

14. A direct fuel injected, internal combustion engine as set forth in claim 13, wherein said heat insulator is tapered inwardly at its center portion.

15. A direct fuel injected, internal combustion engine as set forth in claim 1, wherein said nozzle holding section defines first and second sub-sections, said first sub-section has an inner diameter larger than an inner diameter of said second sub-section, said second sub-section supports said nozzle, and a second buffer space is defined between an outer surface of said nozzle and an inner surface of said first sub-section.

16. A direct fuel injected, internal combustion engine as set forth in claim 15, wherein said second sub-section is disposed closer to said main body of said fuel injector.

17. A direct fuel injected, internal combustion engine comprising a cylinder body defining at least one cylinder bore in which a piston reciprocates, a cylinder head affixed to an end of said cylinder body for closing said cylinder bore and defining a combustion chamber together with said piston and said cylinder bore, said cylinder head defining an aperture opened to said combustion chamber, a fuel injector placed within said aperture and arranged to directly spray fuel into said combustion chamber, said aperture including an injector holding section in which said fuel injector is held, and an fuel passage section opening to said combustion chamber, said fuel passage section having an inner diameter smaller than an inner diameter of said injector holding section, the inner diameter of said injector holding section being larger than an outer diameter of said fuel injector so as to define a buffer space between an outer surface of said fuel injector and the inner surface of said injector holding section, said injector holding section and said fuel passage section together defining a step therebetween, a heat insulator being disposed on said step and said fuel injector being seated on said heat insulator, and said heat insulator having an opening through which fuel is sprayed into said combustion chamber.

18. A direct fuel injected, internal combustion engine as set forth in claim 17, wherein said combustion chamber includes a squish area, and said fuel passage section is opened toward said squish area.

19. A direct fuel injected, internal combustion engine as set forth in claim 18, wherein said opening of said heat insulator gradually tapered toward said fuel injector.

20. A direct fuel injected, internal combustion engine as set forth in claim 1, wherein said aperture has at least one counterbore.

21. A direct fuel injected, internal combustion engine as set forth in claim 1, wherein said main body has a flange by which said fuel injector is supported on said cylinder head, and a second heat insulator is disposed between said flange and said cylinder head.

22. A direct fuel injected, internal combustion engine as set forth in claim 1, wherein said main body has a flange by which said fuel injector is supported on said cylinder head, and a seal member is disposed between said flange and said cylinder head.

23. A direct fuel injected, internal combustion engine as set forth in claim 1, wherein said engine further comprises a spark plug mounted on said cylinder head and arranged to fire the fuel in said combustion chamber.

24. A direct injected, internal combustion engine as set forth in claim 23, wherein said engine further comprises a cooling jacket arranged to cool at least said cylinder head, and said cooling jacket, at least in part, is positioned between said fuel injector and said spark plug.

25. A direct injected, internal combustion engine as set forth in claim 23, wherein said fuel injector is inclined relative to a cylinder bore axis, and said spark plug is disposed generally along the cylinder bore axis.

26. A direct injected, internal combustion engine as set forth in claim 25, wherein said spark plug is disposed generally on the cylinder bore axis.

27. A direct injected, internal combustion engine as set forth in claim 25, wherein said spark plug is decentered from the cylinder bore axis.

28. A direct injected, internal combustion engine as set forth in claim 23, wherein said spark plug is inclined relative to the cylinder bore axis.

29. A direct fuel injected, internal combustion engine as set forth in claim 1, wherein said engine further comprises a cooling jacket arranged to cool at least said cylinder head, and said cylinder head includes at least one rib in said cooling jacket to increase surface area exposed to coolant in the cooling jacket.

30. A direct fuel injected, internal combustion engine as set forth in claim 1, wherein said engine further comprises a fuel rail arranged to supply fuel to said fuel injector, said fuel rail is mounted on said cylinder head, and a third heat insulator is disposed between said fuel rail and said cylinder head.

31. A direct fuel injected, internal combustion engine as set forth in claim 1, wherein said engine operates on a two stroke crankcase compression principle.

32. A direct fuel injected, internal combustion engine as set forth in claim 1, wherein said engine powers a marine propulsion device.

33. A direct fuel injected, internal combustion engine as set forth in claim 1 additionally comprising a second heat insulator also disposed between the cylinder head and a portion of the fuel injector, and the two heat insulators have differing thickness.

34. A direct fuel injected, internal combustion engine comprising a cylinder body defining at least one cylinder bore in which a piston reciprocates, a cylinder head affixed to an end of said cylinder body for closing said cylinder bore and defining a combustion chamber with said piston and said cylinder bore; said cylinder head having an aperture opened to said combustion chamber, said aperture comprising a first wall surface, a fuel injector placed within said aperture, the fuel injector including a body portion and a nozzle portion disposed at a tip of the body portion so as to directly spray fuel into said combustion chamber, said body portion of said fuel injector comprising a second wall surface, a first insulator being positioned around a portion of said fuel injector near said nozzle portion and a second insulator positioned around another portion of said fuel injector apart from said first insulator, and a buffer space being defined among said first surface, said second surface, said first insulator and said second insulator.

35. A direct fuel injected, internal combustion engine as in claim 34, wherein said aperture includes an injector holding section in which said fuel injector is held and an fuel passage section opening to said combustion chamber, said fuel passage section has an inner diameter smaller than an inner diameter of said injector holding section, said injector holding section and said fuel passage section define a step therebetween, said combustion chamber includes a squish area, and said fuel passage section is opened toward said squish area.

36. A direct fuel injected, internal combustion engine as set forth in claim 7, wherein said cylindrical portion is separately formed from a portion that is disposed on said step.

37. A direct fuel injected, internal combustion engine as set forth in claim 21, wherein said buffer space is formed around said main body between said first and second insulators.

38. A direct fuel injected, internal combustion engine as set forth in claim 22, wherein said buffer space is formed around said main body between said insulator and said seal member.

39. An internal combustion engine comprising a cylinder body defining at least one cylinder bore, a piston reciprocating within the cylinder bore, a cylinder head closing an end of the cylinder bore and defining a combustion chamber together with the cylinder bore and the piston, the cylinder head also defining a through-hole communicating with the combustion chamber, the through-hole including first and second sections, the first section having a first inner diameter and the second section having a second inner diameter less than the first inner diameter, the second section being closer to the combustion chamber than the first section, the first and second sections together defining a step therebetween, a fuel injector arranged to spray fuel directly into the combustion chamber, the fuel injector including a body portion and a nozzle portion, the body portion, at least in part, being disposed within the first section and seated on the step, the nozzle portion being disposed within the second section, an outer surface of the body portion and an inner surface of the first section together defining a buffer space therebetween so as to isolate the body portion from the cylinder head, and a heat insulator disposed on the step so that the body portion does not directly abut on the step.

40. An internal combustion engine as set forth in claim 39, wherein the body portion has a flange by which the body portion is mounted on the cylinder head, a second insulator is disposed between the flange and the second insulator.

41. An internal combustion engine as set forth in claim 40, wherein the buffer space is formed around the body portion between the first and second heat insulators.

42. An internal combustion engine as set forth in claim 39, wherein the body portion has a flange by which the body portion is mounted on the cylinder head, a seal member is disposed between the flange and the second insulator.

43. An internal combustion engine as set forth in claim 42, wherein the buffer space is formed around the body portion between the heat insulator and the seal member.

* * * * *

UNITED STATES PATENT AND TRADEMARK OFFICE
CERTIFICATE OF CORRECTION

PATENT NO. : 6,276,338 B1
DATED : August 21, 2001
INVENTOR(S) : Kato et al.

It is certified that error appears in the above-identified patent and that said Letters Patent is hereby corrected as shown below:

<u>Title page,</u>
Item [75], Inventors, second Inventor's name should read: -- Kyozi Hakamata --
Item [56], References Cited, U.S. PATENT DOCUMENTS, please add:
-- 4,727,843  *  3/1988  Petersen et al.   123/470 --

Signed and Sealed this

Twenty-sixth Day of November, 2002

Attest:

Attesting Officer

JAMES E. ROGAN
Director of the United States Patent and Trademark Office